(12) United States Patent
Thomas

(10) Patent No.: US 8,864,107 B2
(45) Date of Patent: Oct. 21, 2014

(54) LAYING NETWORK CABLES IN SEWERS

(75) Inventor: Elfed Thomas, Llandudno (GB)

(73) Assignee: 13 Group Limited, Haydock (GB)

( * ) Notice: Subject to any disclaimer, the term of this patent is extended or adjusted under 35 U.S.C. 154(b) by 1162 days.

(21) Appl. No.: 12/374,404

(22) PCT Filed: Jul. 20, 2007

(86) PCT No.: PCT/GB2007/002769
§ 371 (c)(1),
(2), (4) Date: Nov. 18, 2009

(87) PCT Pub. No.: WO2008/009964
PCT Pub. Date: Jan. 24, 2008

(65) Prior Publication Data
US 2010/0084620 A1     Apr. 8, 2010

(30) Foreign Application Priority Data

Jul. 20, 2006 (GB) ................................. 0614412.5
Mar. 14, 2007 (GB) ................................. 0704893.7

(51) Int. Cl.
*H02G 1/08* (2006.01)
*H02G 9/06* (2006.01)

(52) U.S. Cl.
CPC . *H02G 9/065* (2013.01); *H02G 1/08* (2013.01)
USPC ........ 254/134.3 R; 254/134.3 FT; 254/134.4; 254/134.5

(58) Field of Classification Search
CPC .................................. H02G 9/00; H02G 1/00
USPC ............. 254/134.3 R, 134.3 FT, 134.4, 134.5
See application file for complete search history.

(56) References Cited

U.S. PATENT DOCUMENTS

| 4,496,410 | A  | * | 1/1985  | Davis et al. .................... 156/84 |
| D304,904  | S  | * | 12/1989 | Kercher ......................... D8/380 |
| 5,503,369 | A  | * | 4/1996  | Frost et al. ............ 254/134.3 FT |
| 6,302,379 | B1 | * | 10/2001 | Walters ................. 254/134.3 FT |
| 7,973,250 | B2 | * | 7/2011  | Groeller et al. ............... 174/481 |
| 2005/0105972 | A1 | * | 5/2005 | Klaus et al. .......... 254/134.3 FT |

FOREIGN PATENT DOCUMENTS

DE           19734274 A1    2/1999

* cited by examiner

*Primary Examiner* — Lee D Wilson
*Assistant Examiner* — Seahee Yoon
(74) *Attorney, Agent, or Firm* — Barlow, Josephs & Holmes, Ltd.

(57) ABSTRACT

One form of sewer comprises a pipe having a bottom section 100 incorporating a flow channel 101 along which sewage flows. A cable guide 110 comprises a body section 111 and an arm section 112. The body comprises a panel 111 curved so as to be able to lie substantially flush with the walls of the flow channel 101 and the arm comprises a tube with an internal passage. The arm 112 projects from the body 111 and the passage within the arm 112 extends from an opening 113 provided in the body 111 to an opening 114 provided at the distal end of the arm 112. The openings 113, 114 and the passage within the arm 112 are of suitable dimensions to carry a cable 105. The body is also provided with a cable clip 115.

4 Claims, 5 Drawing Sheets

LAYING NETWORK CABLES IN SEWERS

BACKGROUND AND SUMMARY OF THE INVENTION

The present invention relates to the laying of cables in sewers, and in particular to a means for enabling such cables to be laid along the flow channel at the bottom of a sewer.

In order to install a new hardwired network, it is necessary to provide cables linking the various nodes in the network. Often, this will require the cables to link nodes at one address with nodes at one or more different addresses. In order to minimise disruption caused by the laying of new cables, some network installers have taken to laying cables within sewer pipes rather than constructing dedicated conduits. This provides a convenient path for the cable that is relatively sheltered and can cost less than providing a dedicated conduit. Furthermore, providing a dedicated conduit would typically involve digging a trench for the conduit and filling the trench after installing the conduit, which causes considerable disruption to others, particularly if the cable is to be laid in an urban area.

When laying cables within a sewer, the cheapest and simplest solution is to lay the cables along the flow channel at the bottom of the sewer. A cable lying parallel to the direction of flow in the flow channel has a minor to negligible effect on the flow rate and a similarly minor likelihood of snagging debris and thus blocking of the flow channel. At some point however, the cable must enter/exit the flow channel. At such points, the cable lies across the direction of flow and thus creates a significant barrier to flow and a greatly increased chance of causing a blockage. Accordingly, sewer operators are reluctant to allow cables to be laid in this manner.

An alternative solution has been to pin the cable to the roof of the sewer. This avoids the potential for blockage, however, this solution is considerably more expensive than laying the cable along the flow channel and is often more expensive than preparing a dedicated cable conduit.

It is therefore an object of the present invention to enable a cable to be laid in a sewer in such a manner that alleviates or overcomes the above problems.

According to a first aspect of the present invention there is provided a cable guide, suitable for enabling a cable lying in the flow channel of a sewer to traverse and exit the flow channel without substantially impeding the flow, the cable guide comprising: a body section adapted to lie substantially flush with the wall of the flow channel; and an arm section projecting from the body section, the arm section having a distal end positioned outside the flow channel when the body section lies flush with the flow channel wherein the arm section provides a passage suitable for carrying a cable, the passage extending between an opening provided in the body section and an opening provided at the distal end of the arm section.

The passage in the cable guide above thus provides a means by which a cable can traverse the flow channel with minimal disturbance to the flow.

The cable guide may be formed from Polyvinyl Chloride, Polypropylene, Glass Reinforced Plastic, stainless steel or any other material suitable for resisting decomposition by chemical or biological agents likely to be present within the sewer effluents such as oils, acids and other substances.

The body section may be adapted to lie substantially flush with: one wall of the flow channel; one wall of the flow channel and at least part of the base of the flow channel; or both walls of the flow channel and the base of the flow channel. In order that the body section may lie substantially flush with the wall of the flow channel, one face of the body section may be shaped to correspond with the wall of the flow channel. In some embodiments, the body may be shaped so as to lie within a recess provided in the wall of the flow channel.

A second face of the body section forms a boundary to the flow channel. The second face may be shaped and/or otherwise adapted to minimise disturbance of the flow. The opening provided on the body section may be provided on the second face.

The cable may run across the second face of the body to the opening. In such embodiments, in order to ensure that the cable enters the opening at an angle that will minimise impedance of the flow, one or more cable clips may be provided. The or each clip may be provided on the second face of the body section. In such embodiments, the clips may be formed integrally with the body portion. Additionally or alternatively, one or more cable clips may be provided directly on the walls or base of the flow channel. Preferably, one cable clip is provided adjacent to the opening provided in the second face of the body section. In one preferred embodiment, the or each clip comprises a pair of resilient jaws adapted to retain a cable pushed into a position between the jaws. Additionally, to further secure the retention of the cable, a locking element may be provided, the locking element adapted, in use, to wrap over the cable and enclose the cable within the clip. Preferably, the clip (and in such embodiments the locking element) will be formed from stainless steel.

Alternatively, the opening may be provided at or towards the periphery of the second face and the cable may run behind the second face. In such embodiments, the cable may run in an extension of the passageway between the first and second faces. In an alternative to this arrangement, the cable may run across the first face of the body to enter the passageway. In order to maintain the substantially flush relationship between the body section and the wall of the flow channel, either or both may be provided with a recessed channel along which the cable may run.

The arm section may be provided in a fixed relationship to the body portion. Alternatively, the arm section may be adapted such that its orientation relative to the body portion may be varied and/or such that it may be bent into an advantageous shape or position. Similarly, the body section may be adapted to be bent into an advantageous shape. This will allow the cable guide to be adapted to local variations in the size and/or shape of the flow channel.

The arm section may be adapted to minimise disturbance to any flow outside the flow channel. Such additional flows may occur during peak usage or due to dissipation of heavy rainfall. To achieve this, the arm section may have a lower face adapted to lie flush with the sewer. Additionally, the arm section may have an upper face shaped and/or otherwise adapted to minimise disturbance of the flow.

The arm section and/or the body portion may be retained in position by use of a suitable adhesive, such as an epoxy resin or similar. Preferably, the adhesive is adapted to cure within a time period of say, 1 hour or less. Most preferably, the adhesive is adapted to cure within a time period of say, 15 minutes or less. Advantageously, the adhesive is adapted to cure in the presence of water. Alternatively, the body section may be secured in position by means of suitable fixing means. The suitable fixing means may comprise bolts, screws, nails or similar driven into the wall of the flow channel through fixing holes provided in the body.

In some embodiments, the arm section may be adapted to lie in a pre-existing or specifically prepared groove or recess in the sewer. In such embodiments, the arm section may be retained in the groove or recess by adhesive or any other suitable means. Preferably, in such embodiments, the arm section and/or body portion substantially fills the groove or recess, such that a smooth flow may be achieved. If the arm section and/or body portion does not fill the groove or recess, then a suitable filler material may be used to fill and/or smooth over the groove or recess.

In one preferred embodiment, the body section comprises a panel shaped to conform to the profile of the flow channel and the arm section comprises a tube projecting from the face of the body section adapted to conform to the profile of the flow channel.

According to a second aspect of the present invention there is provided a network comprising: one or more cables laid along the flow channels of sewers; and one or more cable guides according to the first aspect of the present invention.

The network of the second aspect of the present invention may incorporate any or all of the features described in relation to the cable guide of the first aspect of the invention as desired or as appropriate.

Preferably, a cable guide according to the first aspect of the present invention is provided at each point where a cable is required to enter/exit the flow channel of a sewer. The cable guides may be provided on either side of bends and/or junctions in the sewer and at places wherein the cable is to exit the sewer altogether. At such points the cable may be pinned to the walls or roof of the sewer once it exits the flow channel. Additionally or alternatively, the cable may be passed into a bypass tube or duct or into an exit duct once it exits the flow channel. Where the cable exits the sewer, the exit point of the cable from the sewer may be sealed around the cable to inhibit the escape of noxious or unpleasant gases.

The network can be used for any data. The cables within the network may be adapted to early electrical or optical data signals and may thus be electrical data cables or fibre optic cables as required.

According to a third aspect of the present invention there is provided a method of laying a cable network incorporating at least one cable lying in the flow channel of a sewer comprising the steps of: laying a cable in the flow channel of a sewer; installing a cable guide according to the first aspect of the present invention at points wherein the cable is required to enter/exit the flow channel; and passing the cable through the cable guide.

The method of the third aspect of the present invention may incorporate any or all of the features described in relation to the cable guide of the first aspect of the invention or the network of the second aspect of the present invention as desired or as appropriate.

In embodiments wherein a clip is provided, the method may include the additional step of fixing the cable in position using the clip.

The method may involve providing for the cable to leave the flow channel on either side of bends and/or junctions in the sewer and at places wherein the cable is to exit the sewer altogether. At such points the method may involve pinning the cable to the walls or roof of the sewer once it exits the flow channel. Additionally or alternatively, the method may involve passing the cable into a bypass tube or duct or into an exit duct once it exits the flow channel. Where the cable exits the sewer, the method may involve sealing the exit point of the cable from the sewer around the cable to inhibit the escape of noxious or unpleasant gases.

According to fourth aspect of the present invention there is provided a method of installing a cable guide in accordance with the first aspect of the present invention in the flow channel of a sewer comprising the steps of: applying adhesive to the cable guide; and positioning the cable guide at a desired location in the flow channel of a sewer.

The method of the fourth aspect of the present invention may incorporate any or all of the features described in relation to the cable guide of the first aspect of the invention, the network of the second aspect of the present invention or the method of the third aspect of the present invention as desired or as appropriate.

In relation to some embodiments, the method may incorporate the step of providing a groove or recess for the arm section and/or the body portion. The groove or recess may be formed by use of a disc cutter. This can enable the convenient formation of a groove or recess of pre-determined width and depth. In such embodiments, the method may comprise the further step of applying filler material over the arm section or body portion to provide a smooth surface.

Preferably, the filler material is of sufficient viscosity to substantially hold its shape whilst curing thus allowing the groove or recess to be filled. Advantageously, the filler material is adapted to cure in the presence of water. The filler material may be an epoxy resin. If an epoxy resin adhesive is used to retain either the arm portion or the body portion in position, the filler material may be the same epoxy resin.

BRIEF DESCRIPTION OF THE DRAWING FIGURES

In order that the invention can be more clearly understood it is now described further below with reference to the accompanying drawings.

DETAILED DESCRIPTION OF AN EXEMPLARY EMBODIMENT

Figure 1:
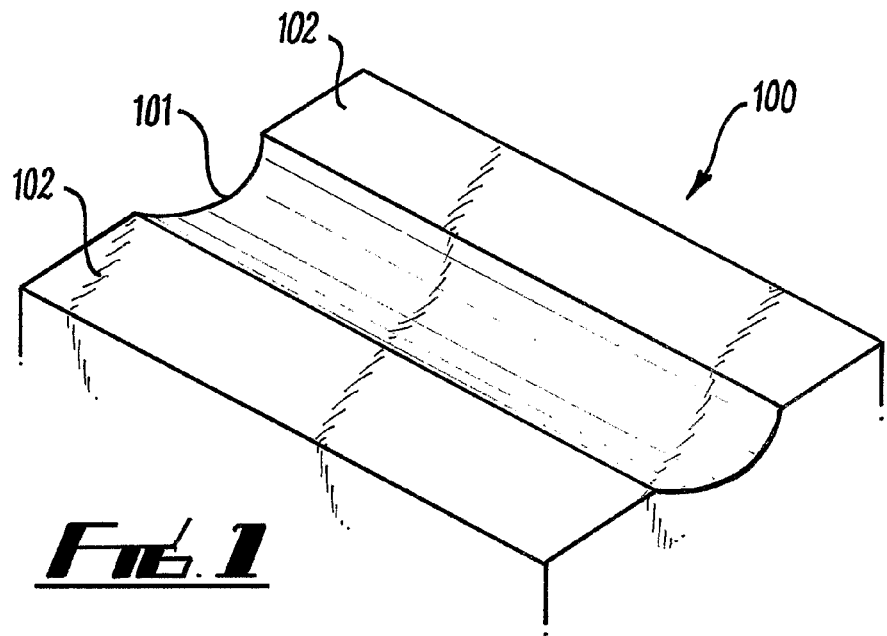
FIG. 1 is a schematic view of the base portion of a sewer incorporating a flow channel.

Referring now to FIG. 1, one form of sewer comprises a pipe having a bottom section 100 incorporating a flow channel 101 along which sewage flows. When there is a heavy flow load, the sewage can also flow over the banks 102 adjoining the flow channel 101.

Figure 2A:
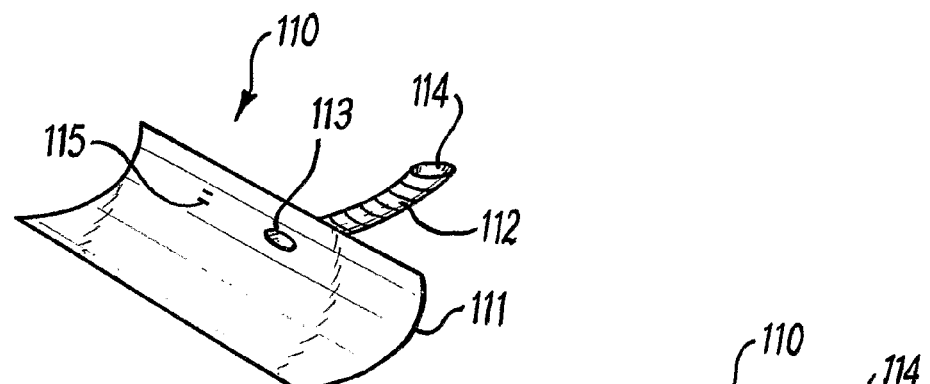
FIG. 2a shows one embodiment of a cable guide according to the present invention suitable for allowing a cable to enter/exit the flow channel of a sewer without substantially impeding the flow.

Referring now to FIG. 2a, one embodiment of a cable guide 110 is shown. The cable guide 110 comprises a body section 111 and an arm section 112. In the present embodiment, the body comprises a panel 111 curved so as to be able to lie substantially flush with the walls of the flow channel 101 and the arm comprises a tube with an internal passage. The arm 112 projects from the body 111 and the passage within the arm 112 extends from an opening 113 provided in the body 111 to an opening 114 provided at the distal end of the arm 112. The openings 113, 114 and the passage within the arm 112 are of suitable dimensions to carry a cable 105. The body is also provided with a cable clip 115.

The cable guide 110 is formed from stainless steel. Accordingly, the cable guide 110 is able to resist decomposition by chemical or biological agents likely to be present within the sewer. In alternative embodiments, the cable guide 110 may be formed from any other suitable material.

Figure 2B:
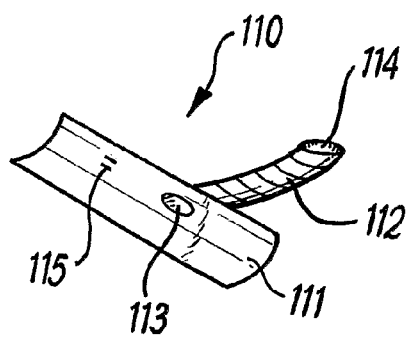
FIG. 2b shows an alternative embodiment of a cable guide according to the present invention suitable for allowing a cable to enter/exit the flow channel of a sewer without substantially impeding the flow.

An alternative embodiment of a cable guide 110 is shown in FIG. 2b. The embodiment of FIG. 2b differs from that of FIG. 2a in that the body portion 111 comprises a panel curved so as to be able to lie substantially flush with just one wall of the flow channel 101. The other features of the cable guide 110 of FIG. 2b are the same as those of the cable guide of FIG. 2a.

Figure 3:
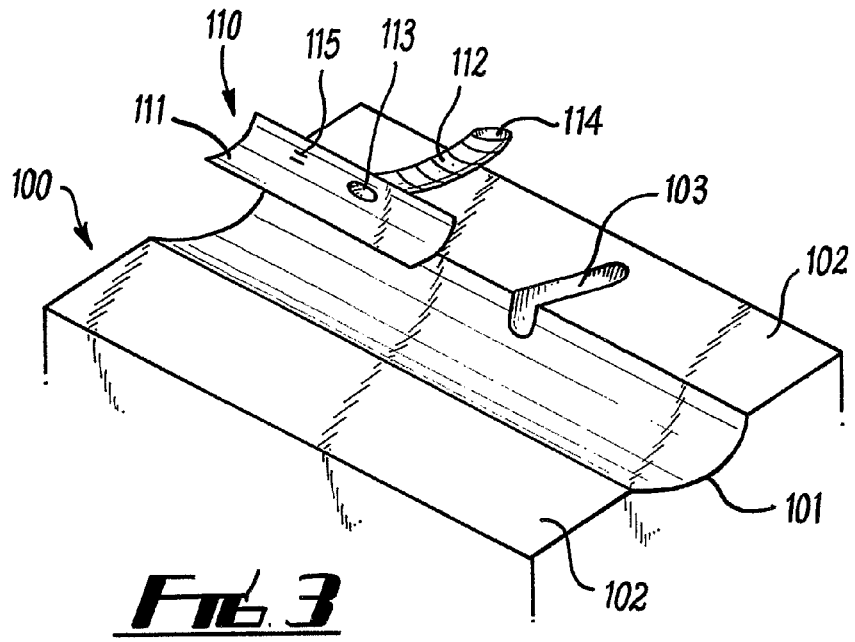
FIG. 3 shows an intermediate stage in the process of installing a cable guide according to the present invention in a flow channel of a sewer.
Figure 4:
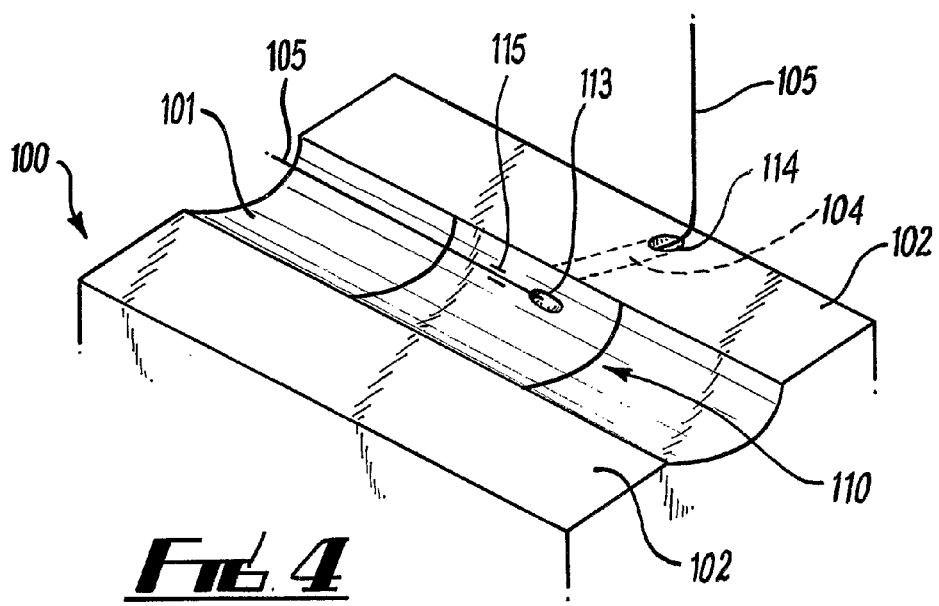
FIG. 4 shows a cable guide according to the present invention installed in the flow channel of a sewer.

The cable guide 110 is installed into the sewer by the process illustrated in FIGS. 3 and 4. Firstly, it is determined at what location the cable 105 is to enter/exit the flow channel 101. At this location a groove 103 is cut into the banks 102 and the side of the flow channel 101. The groove 103 is sufficiently wide and deep to accept the arm 112. Epoxy resin of a type adapted to cure under water is applied to the undersides of the body 111 and the arm 112. The cable guide 110 is then placed in the flow channel 101 such that the arm 112 lies within the groove 103. Filler material 104, which may be the same epoxy resin used to secure the body 111 and arm 112 in position, is then applied to smooth over the top of arm 112, leaving opening 114 uncovered, so as to provide minimal impediment to flow along banks 102.

Once the cable guide 110 is installed, a cable 105 can be passed through the passage between openings 113 and 114.

By utilising a cable guide in this way, disruption to the flow within the channel 101 by the entrance or exit of the cable 105 is minimised. The cable 105 can be retained in position by the cable clip 115. This prevents a high point occurring in the cable 105 as it bends to enter opening 113. Additionally, the clip 115 restricts the lateral movement of the cable 105 prior to entering opening 113, preventing the cable 105 lying across the direction of flow. In this manner, the clip 115 helps to reduce the disruption to the flow caused by the entrance/exit of the cable 105.

The cable guide 110 may be applied to the sewer in wet or dry conditions, as long as a suitable adhesive is used. As the installation process has few steps, it can be completed in under 1 hour. Accordingly, the use of such cable guides 110 along with the laying of the cable 105 loose in the flow channel 101 provides a relatively inexpensive and relatively quick method of laying cables through sewers. Accordingly, this cable guide and method may be applied to constructing networks, such as data networks, by laying cables through sewers. An additional advantage of using the cable guide according to the present invention is that if a network cable needs to be removed, the cable guide 110 can be left in place and does not provide a significant impediment to flow along the flow channel 101. Alternatively, if a cable 105 is to be replaced, it is quick and convenient to remove the old cable 105 and insert a replacement cable 105.

Referring now to FIGS. 5a-d, an alternative embodiment of a cable guide 210 is shown. In this embodiment, the cable guide comprises a body section 211 and an arm section 212. This embodiment differs from the previous embodiment in that the body comprises a relatively small panel 211 curved so as to be able to lie in a recess provided in the walls of the flow channel 101 (as is shown most clearly in FIG. 5c) and the arm 212 which still comprises a tube with an internal passage, is relatively long compared to the body 211. As in the previous embodiment the arm 212 projects from the body 211 and the passage within the arm 212 extends from an opening 213 provided in the body 211 to an opening 214 provided at the distal end of the arm 212. The openings 213, 214 and the passage within the arm 212 are of suitable dimensions to carry a cable 105. The body 211 is also provided with a cable clip 215. This embodiment is particularly useful in larger sewers such as those with diameters in the range 0.5-4 m.

Figure 5A:
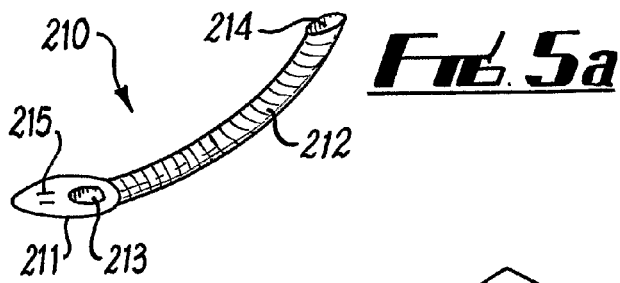
FIG. 5a shows a further alternative embodiment of a cable guide according to the present invention.
Figure 5B:
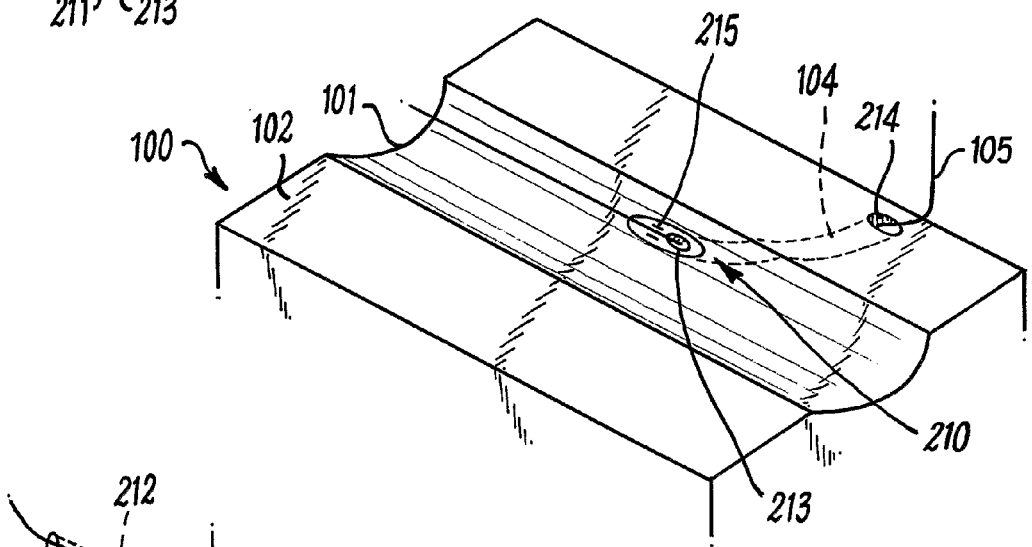
FIG. 5b shows the further alternative embodiment of a cable guide according to figure installed in the flow channel of a sewer.
Figure 5C:
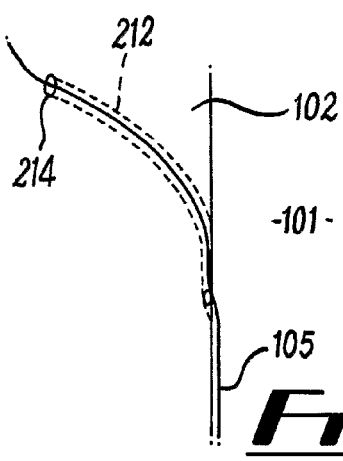
FIG. 5c is a schematic cross-sectional view of how the cable guide of FIG. 5a fits to the wall of a flow channel.
Figure 5D:
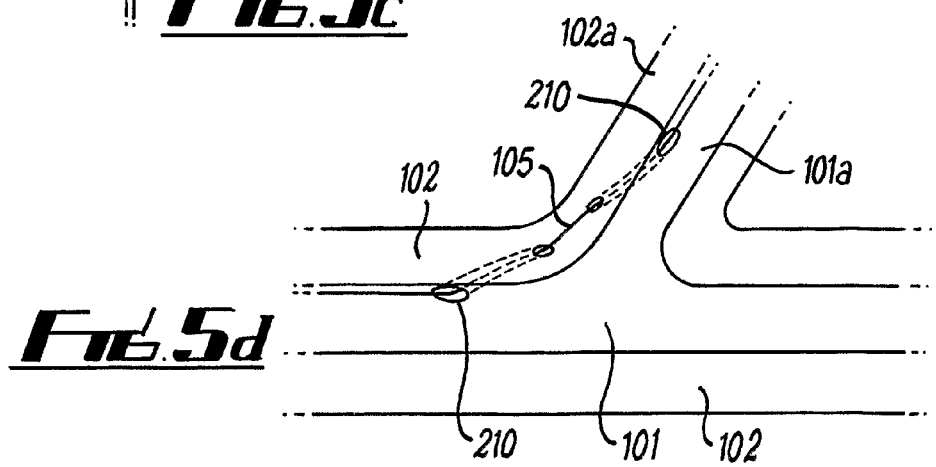
FIG. 5d shows how two of the cable guides of FIG. 5a may be used to guide a cable around a junction in a sewer.

FIG. 5d illustrates one use of the cable guide 210. In this example, a pair of cable guides 210 are used to guide a cable 105 out of a first flow channel 101 and into a second flow channel 101a without lying across the direction of flow at the junction of the two flow channels 101, 101a. In this example, as with the other examples described below, a cable guide 110 such as those shown in FIGS. 2a and 2b may be used in place of the cable guide 210, as desired or as appropriate.

In the example shown, the cable 105 merely lies along the banks 102 and 102a, however, in other embodiments, the cable 105 may be pinned to the banks 102, 102a or pinned to the wall and/or roof of the sewer. Similarly, these methods can be applied to other junctions, bends or similar within the sewer 101. In some sewers, a bypass tube or duct is provided which enables a tube to bypass a junction, bend or similar. Where such bypass tubes are provided, the cable may exit the flow channel using a cable guide 210 pass through the bypass tube before re-enter the flow channel via a second cable guide 210.

Another example of a position wherein the cable guide 210 may be used is in allowing the cable 105 to exit the flow channel 101 at points wherein the cable 105 is to exit the sewer 100 altogether. At such points, the cable 105 may be pinned along the sewer wall between the banks 102 and an exit duct. The exit duct may allow the cable 105 to enter its final destination (such as a building), connect to another cable, enter another sewer or other such conduit. In this manner, the cable 105 may be connected to one or more other cables or nodes to provide a network.

In order to prevent the escape of noxious or unpleasant gases from the sewer, the duct may be sealed around the cable. This may be achieved by applying a suitable filler material or adhesive around the cable 105. Alternatively, this may be achieved by providing a suitable sealing means. The sealing means may be bung adapted to fit said duct and provide a substantially airtight passage through which said cable 105 may pass.

Figure 6:
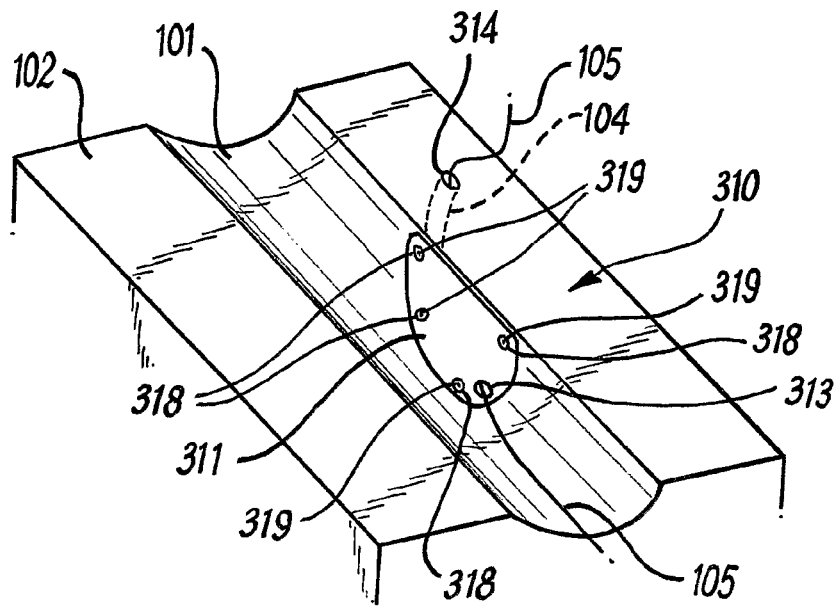
FIG. 6 shows another alternative embodiment of a cable guide according to the present invention.
Figure 7:
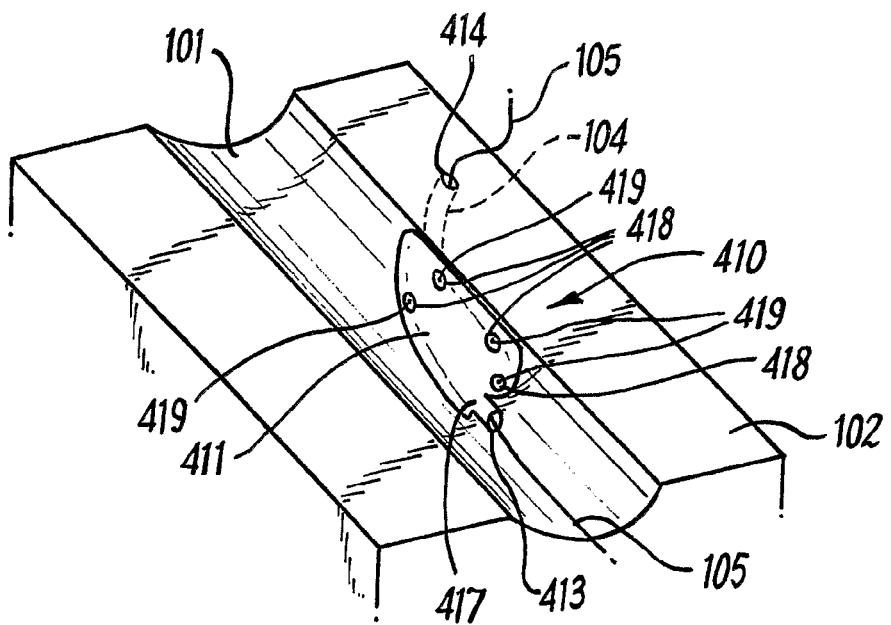
FIG. 7 shows a still further alternative embodiment of a cable guide according to the present invention.
Figure 8:
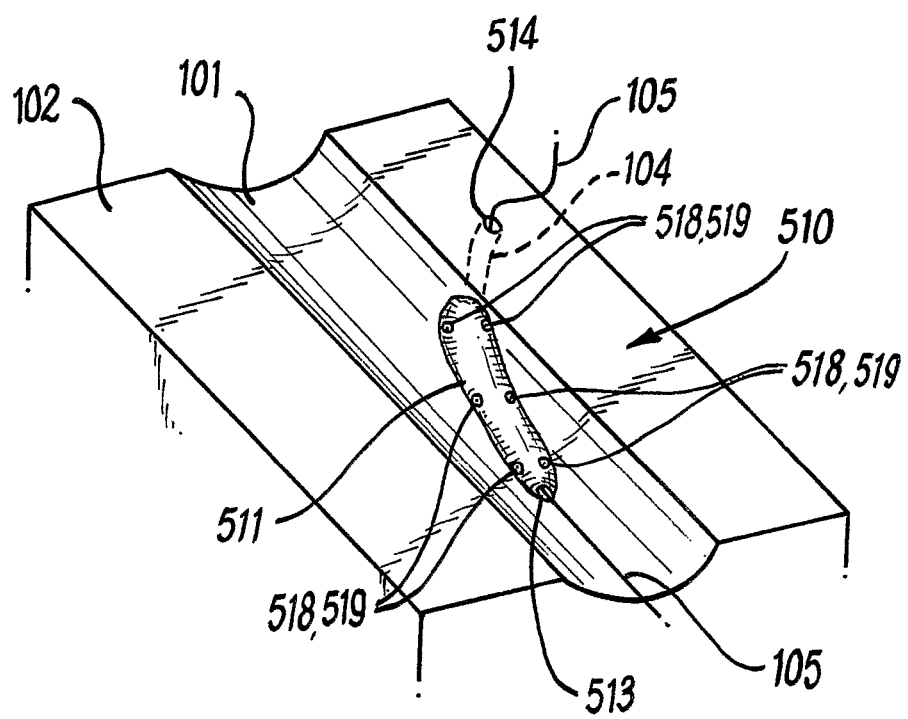
FIG. 8 shows an additional further alternative embodiment of a cable guide according to the present invention.

Further possible alternative embodiments of a cable guide according the present invention are illustrated in FIGS. 6, 7, and 8. In FIG. 6, the cable guide 310 has the opening 313 provided close to the periphery of the body section 311, and the opening 314 remains at the distal end of the arm 312. The cable 105 runs behind the body section 311 to the arm section (not visible from this angle). Either or both of the body 311 and the flow channel 101 may be provided with a recessed channel (not shown) along which the cable 105 may run, so as to maintain the body section 311 substantially flush with the flow channel 101. The body section 311 is secured in position by fixing means 319, typically bolts, screws, nails or similar. The fixing means 319 extended through and engage holes 318 and are driven into the wall of the flow channel 101.

In FIG. 7, the cable guide 410 has the opening 413 provided at an end of a second arm projection 417, and the opening 414 remains at the distal end of the arm 412. The cable 105 passes along a passageway provided through the body section 411 to the first arm section (not visible from this angle). As in the previous embodiment, the body section 411 is secured in position by fixing means 419, typically bolts, screws, nails or similar. The fixing means 419 extend through and engage holes 418 and are driven into the wall or the flow channel 101. If required to accommodate the cable 105, the surface of the body section 411 may have a smooth projecting bulge (not shown).

In FIG. 8, the cable guide 510 has the opening 513 provided at an end of a thin bulged body section 511, and the opening 514 remains at the distal end of the arm 512. The cable 105 passes along a passageway provided through the body section 511 from the opening 513 to the first arm section (not visible from this angle). As in the previous embodiment, the body section 511 is secured in position by fixing means 519, typically bolts, screws, nails or similar. The fixing means 519 extend through and engage holes 518 and are driven into the wall of the flow channel 101.

Whilst the embodiments of FIGS. 6, 7 and 8 are secured in position using fixing means such as screws, bolts, nails or similar, it is clear that they may be adapted to be secured in position by use of adhesive as described in relation to the embodiments of FIGS. 1-5. Similarly, the embodiments of FIGS. 1-5 may be may be adapted to be secured in position by use of fixing means such as screws, bolts, nails or similar as described in relation to the embodiments of FIGS. 6, 7 and 8, if desired.

It is of course to be understood that the invention is not to be restricted to the details of the above embodiments which have been described by way of example only.

The invention claimed is:

1. A cable guide and anchoring system for laying a cable within a flow channel of a sewer section comprising:
    a sewer section having opposing banks and a flow channel disposed between the banks, the flow channel having a central base and curved walls extending upwardly and outwardly from the central base to the opposing banks;
    a cable guide including a curved body panel having an outer curved face adapted to match the curved wall of the flow channel and an inner curved face which forms a boundary to the flow channel, whereby the body panel lies substantially flush with the wall and minimizes disturbance of flow within the flow channel,
    said cable guide further comprising a tubular arm projecting from the outer curved face of the body panel, the arm having a distal end which is positioned outside the flow channel when the body panel lies flush with the flow channel, said tubular arm providing a cable passage extending between an opening in the body panel and an opening at said distal end of said arm, said openings and said passage being configured and arranged for receiving and carry the cable, said arm having a diameter that is smaller than a diameter of the flow channel,
    said sewer section including a groove cut into one of the banks and the adjacent curved wall, said arm being received within said groove when said body panel lies flush with the wall, said opening in said distal end of said arm being accessible from said bank, whereby a cable can enter/exit the distal end of the arm without disturbing flow along the bank and cable can enter/exit the body panel into the flow channel within disturbing flow along the flow channel; and
    a fixing system configured and arranged to retain said cable guide in fixed relation with said sewer section.

2. The cable guide and anchoring system of claim 1 wherein said fixing system comprises an adhesive material operative to retain said body panel in position on the face of the flow channel and said tubular arm in position within said cut groove in said sewer section.

3. The cable guide and anchoring system of claim 1 wherein said body panel further comprises fixing holes, said fixing system comprising a plurality of fixing elements driven through said fixing holes and into the wall of the flow channel.

4. The cable guide and anchoring system of claim 3 said fixing elements are selected from the group consisting of: bolts, screws and nails.

* * * * *